Feb. 9, 1937.  F. L. O'BRYAN  2,070,340
REMOTE METERING AND SERVICE CONTROL APPARATUS
Filed Feb. 19, 1931  3 Sheets—Sheet 3
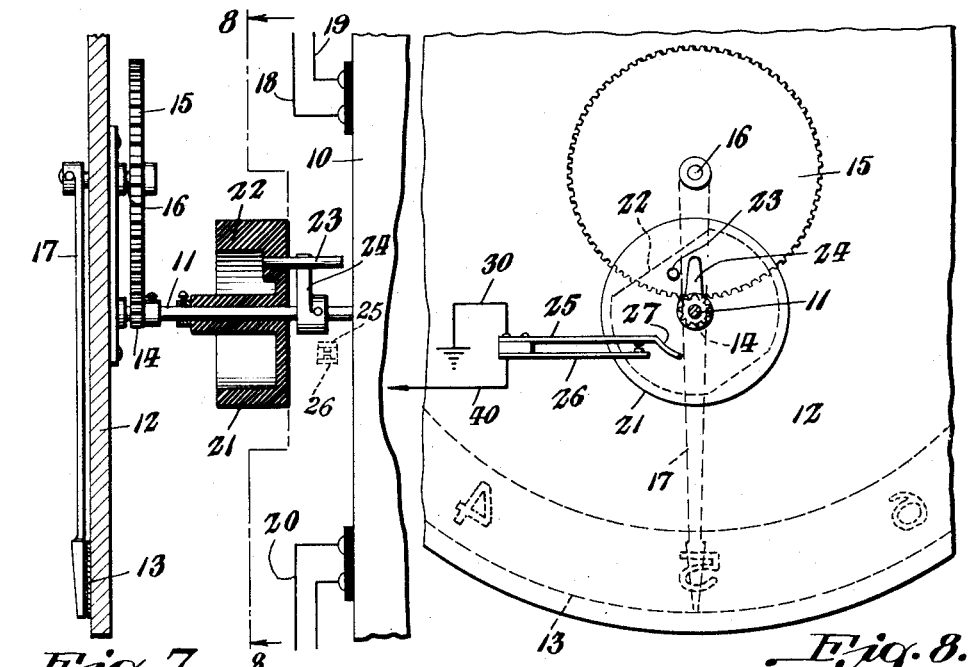
Fig. 7.  Fig. 8.
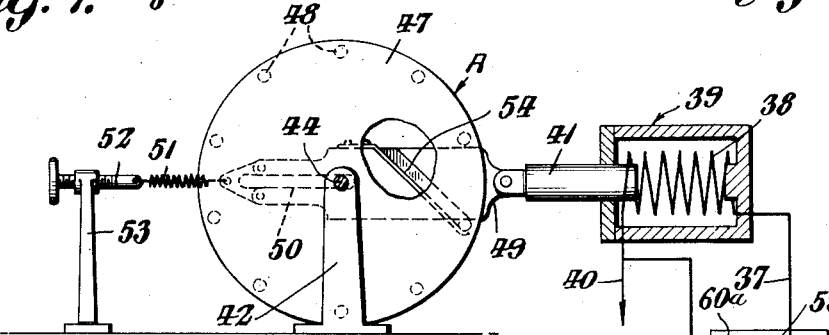
Fig. 9.
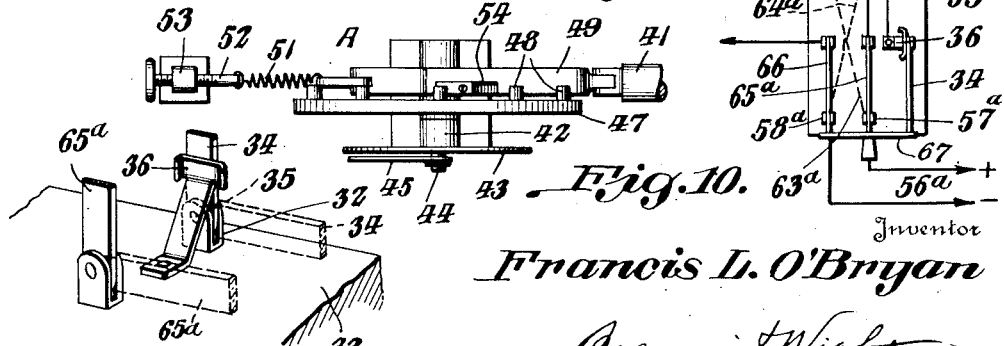
Fig. 10.
Fig. 11.
Inventor
Francis L. O'Bryan
By Philemon Wight
His Attorneys Patented Feb. 9, 1937

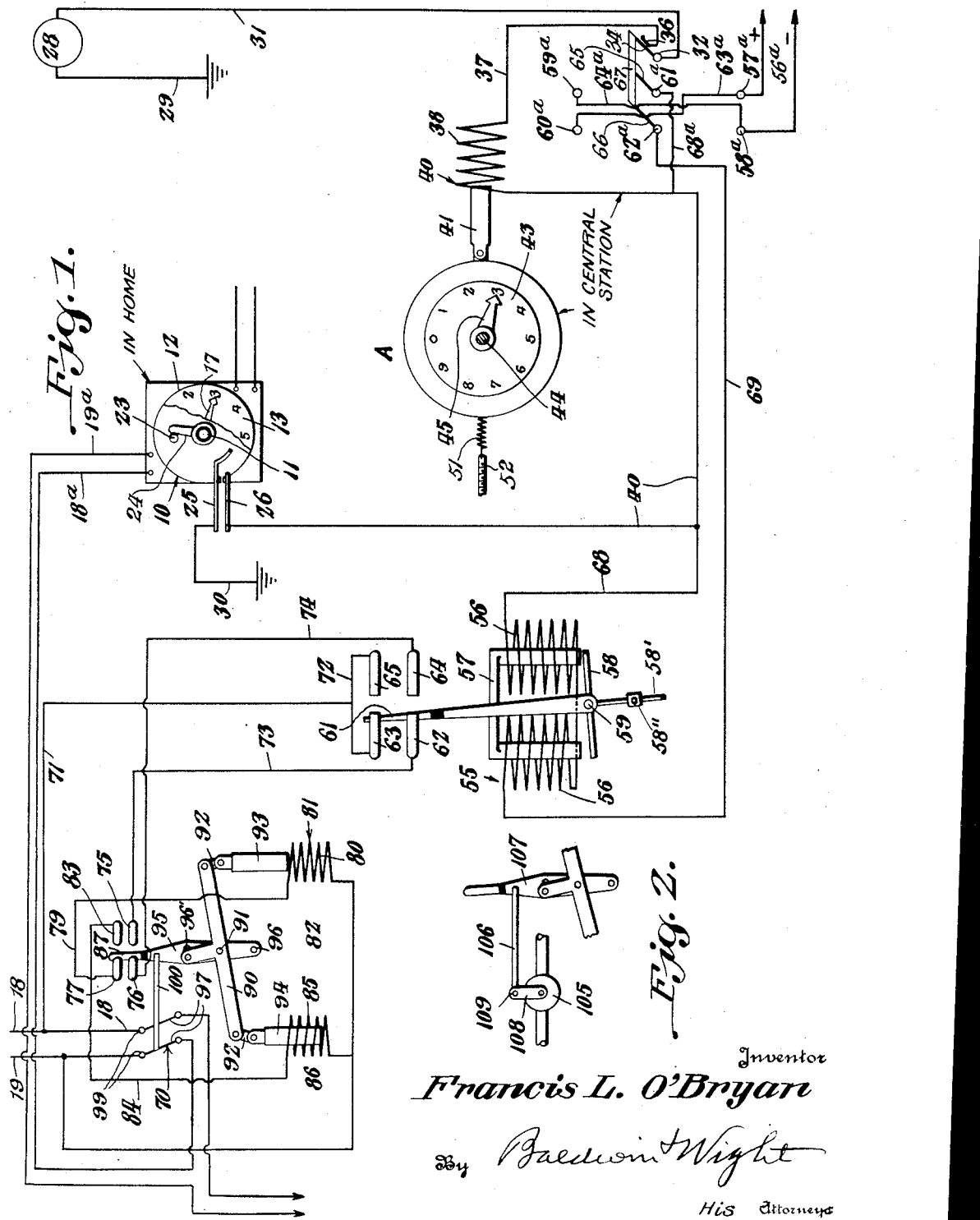

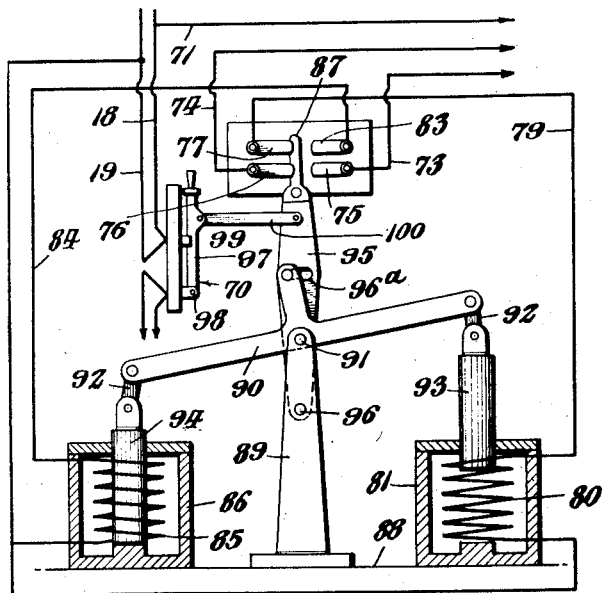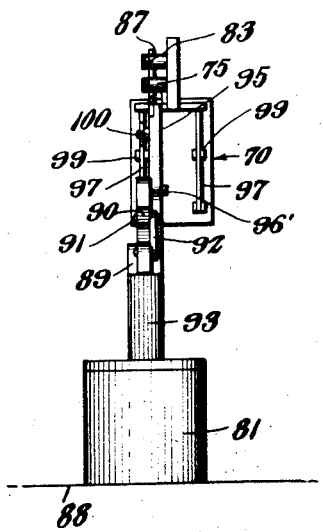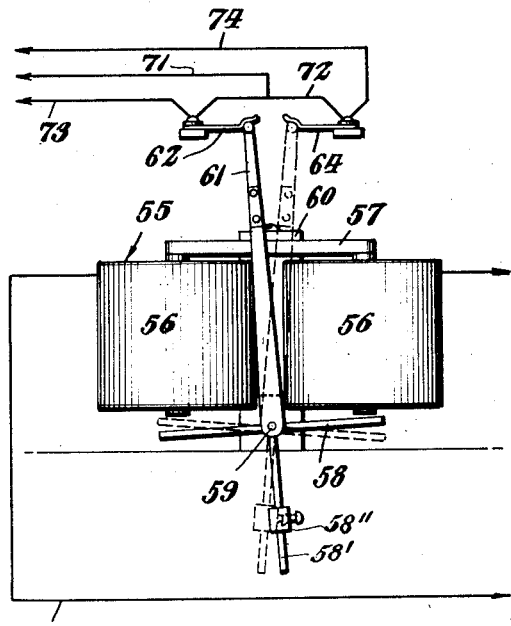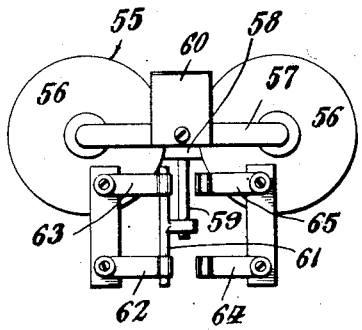

2,070,340

UNITED STATES PATENT OFFICE 2,070,340

REMOTE METERING AND SERVICE CONTROL APPARATUS

Francis L. O'Bryan, Framingham Center, Mass.; Marion O'Bryan, administratrix of said Francis L. O'Bryan, deceased, assignor of one-fourth to John J. Prindeville, Framingham Center, Mass.

Application February 19, 1931, Serial No. 517,128

4 Claims. (Cl. 177—352)

This invention relates to a metering and service control mechanism primarily for use in the servicing of electricity, gas, water or the like by public utility corporations to homes or customers.

One important object is to provide a means whereby a service meter in the home or other place of consumption will actuate a register located in the central station or at a desired remote point, so that a direct reading of the meter may be had at all times either in the place of consumption or at the central station.

Another object is to provide means whereby the aforesaid service may be interrupted or cut off from a remote point, as from the central station in order to enable the service to be instantly checked at any desired time to thus provide for better control of the collection of accounts for service, to aid in avoiding losses by use of the services by unauthorized persons, and to enable the rendition of bills at any desired time and for any specified period of service.

Another object is to provide a novel electrical means under control of a service meter for actuating a register corresponding in reading thereto, at the central station.

A further object is to provide a novel, remotely controlled relay mechanism to cut off or on the service involved, and from the central station.

A further object is to provide mechanism wherein conductor means for the circuits of both the register and the remote control have conductors common to both of them and switches which cannot be closed at the same time.

Other objects will become apparent from a consideration of the following description taken in connection with accompanying drawings illustrating an embodiment of the invention.

In the drawings:

Figure 1 is a view showing all parts of the mechanism or system in electrical diagram;

Figure 2 is a fragmentary diagram showing a valve arranged to be operated by the improved mechanism;

Figure 3 is a view partly in elevation and partly in section of a polarized relay device;

Figure 4 is an end elevation of the relay device shown in Figure 3;

Figure 5 is an elevation of another polarized relay device;

Figure 6 is a plan view of the relay device shown in Figure 5;

Figure 7 is a central vertical sectional view of the service meter;

Figure 8 is a sectional view taken on the line 8—8 of Figure 7;

Figure 9 is a side view of the meter-controlled register, with the dial and pointer removed, in connection with the control switch;

Figure 10 is a plan view of said register, and

Figure 11 is a fragmentary perspective view of the control switch.

Referring specifically to the drawings, 10 designates a conventional electric meter such as is commonly installed in the home, shop or any place of consumption remote to the central station. While the invention is specifically shown in connection with an electric meter, that is one adapted to register the use or consumption of electricity, it is of broader scope since the principles may be equally well applied to the use or consumption of gas, water or the like.

The shaft or spindle of the meter 10, which registers through the consumption of the electric current, rotates clockwise, being shown at 11, as journaled on the stationary dial 12, whose usual numerals or calibrations are delineated on a flat ring 13 suitably secured to the dial. A pinion 14 is fixed to the shaft 11 and is enmeshed with a larger pinion 15, keyed to a stub shaft 16, journaled in said dial 12, and which carries a pointer 17 movable over the face of the dial and coacting with the calibrations of the ring 13. The feed wires for the electric current from the central station to the point of use are shown at 18 and 19 while 18ª and 19ª are branch wires leading to the meter 10.

Located at the central station or the equivalent, is a register generally designated A which is adapted at all times to show exactly the same reading as is given by the pointer and dial of the meter 10. The actuation of the register A is effected by rotation of the spindle or shaft 11. To the latter end, a disk 21 is unbalanced or loosely mounted on said shaft, one portion 22 of which is weighted or heavier than the remainder. A pin 23 projects from one side of the disk 22 and is disposed in the path of movement of an arm 24 rigid on but insulated from the shaft 11. The disk 21 is of insulation.

Normally, since the pin 23 is held in its lowermost position due to the weighted portion 22 of the disk, each rotation of the spindle 11 will cause engagement of the arm 24 therewith, which will turn the disk and raise projection 23 upwardly and past the vertical so that the weight 22 will cause it to fall. In falling, the projection 23 engages a contact 25 which is normally spaced from a contact 26 and which jointly therewith forms a switch to control the feed of current to actuate the register A. The pin moves the contact 15 into engagement with contact 26 and in order to prolong the closing of the circuit sufficiently to actuate the register A, the contact 25 is provided with an extension 27 of suitable length.

The electric current for operating the register A may be either direct or alternating. As shown, the current is for example supplied by a dynamo 28, one side of which is grounded at 29. The contact 25 is also grounded at 30. From the other side of said dynamo or generator, a conductor 31 leads to a contact 32 mounted on a switch block 33. A switch arm or blade 34 is pivoted at 35 to the contact 32 and is adapted to engage another contact 36 on the block 33. From the contact 36, a conductor 37 extends, including the winding or coil 38 of a solenoid 39; and from the latter, a conductor 40 leads to the contact 26. An armature or plunger adapted to be attracted by the closing of the circuit through the coil 38, is shown at 41.

Reverting to the register A, it specifically comprises a bracket or standard 42 rigidly mounting a dial 43 having calibrations or numerals as shown corresponding to the numerals on the ring 13. A spindle or shaft 44 is journaled in the bracket 42 and carries a pointer 45 coacting with numerals on the dial 43 to show exactly the same reading or indication at the central station as does the meter at the point of consumption. Rigid with the shaft 44 is a disk 47, the shaft, disk and pointer 45 constituting a unit rotatable with respect to the bracket. Extending rearwardly from disk 47 is a plurality of equidistantly spaced pins or lugs 48, being ten in number and corresponding one to each numeral or division of dial 43.

A slide or actuator 49 is provided for the rotatable unit and is insulated from but connected to the armature 41 and is mounted and guided on bracket 42 for horizontal movement. The actuator 49 has an elongated slot 50 in which the shaft 44 extends to aid in mounting the slide and also to limit the movement thereof in both directions. A contractile coil spring 51 is connected to actuator 49 and also to an adjusting screw 52 mounted on a bracket 53. The spring 51 maintains the actuator in and urges it to the position shown in Figure 9, while the actuating movement is effected when it is drawn in the opposite direction by the pull on the armature 41 when the circuit is closed through the winding 38. The actuator 49 has a cam or inclined element 54 of spring metal adapted to engage the pins 48.

As a result, with meter 10 registering and electric current flowing from the source 28, and with the blade 34 in contact with the element 36, which is normally the case, the electric circuit will be successively established and broken through the solenoid winding 38 through the coaction of the arm 24 with the projection 23 and the engagement of the latter with the contact 25, the portion 27 determining the dwell or duration of time when the circuit is closed. The pointer 17 is so geared that it turns the distance of one numeral of the ring 13 or one-tenth of a revolution for each rotation of the shaft 11 and since the latter moves the actuator 49 once for each complete revolution of the shaft 11, the pointer 45 will be moved correspondingly to pointer 17 and each dial and pointer will always correspond in their indications, the same reading for the electric or other meter thus appearing at the home or point of use and at the remote point such as the central station. It will be understood that each time the coil 38 is energized, it attracts the armature 41, thus sliding the actuator 49 and causing the cam 54 to engage the adjacent pin 48 and to thereby rotate the disk 47 counterclockwise one-tenth of a revolution, and that at the end of each actuation, the spring 51 will restore the actuator to its normal position by sliding it away from the solenoid so that it may engage the next succeeding pin during which operation the spring element 54 yields through contact with that pin 48 in its path and thereafter snaps to a position for operating engagement therewith on the succeeding operation of the actuator.

Means are also provided for remote control or actuation from the central station or equivalent, to cut off or establish, at will, the supply of the electricity through the meter 10 to the point of use. In this connection a polarized relay 55, as detailed in Figures 3 and 4, is employed, the coils 56 thereof coacting with a double armature 57, the flow of current in one direction being adapted to move an armature 58 to the position shown in Figures 1 and 3, while flow of current in the reverse direction will move the armature 58 to the other position which is shown in dotted lines in Figure 3. The armature 58 is cruciform and is pivoted on a rod 59 carried by the supporting structure or bracket 60 of the relay. The upright arm of said armature carries a T-shaped switch arm 61, insulated therefrom and adapted in one position to bridge a pair of contacts 62 and 63 and in the other position to bridge a pair of contacts 64 and 65.

The armature is provided with a depending stem 58' on which is slidably and adjustably mounted a weight 58''. The weight serves to dampen the movement of the armature and to thus prevent the armature's being thrown as a result of alternating currents in the relay windings, such as might take place if wires were crossed. By adjustably positioning the weight on the stem 58', currents having fequencies above any predetermined value will be prevented from actuating the armature. For example, the weight may be set so that stray currents having frequencies over ten cycles per second will not operate the relay. Since all commercial frequencies are well over ten cycles per second, there will be no danger of stray A. C. currents operating the relay at an improper time.

The electric current for the said relay 55 is supplied from any suitable source of direct current, as through wires 56ª to contacts 57ª and 58ª mounted on the block 33. The latter also mounts contacts 59ª and 60ª as well as contacts 61ª and 62ª. Polarity reversing conductors 63ª and 64ª respectively connect contacts 57ª and 60ª, and 58ª and 59ª. Switch blades or arms 65ª and 66 are pivoted to contacts 61ª and 62ª for engagement as shown in Figure 9 with contacts 57ª and 58ª, respectively, for flow of current in one direction, or with contacts 59ª and 60ª for flow of current in the opposite direction. A polarity changing or reversing switch is thus provided. Said blades 65ª and 66 are connected by a handle or bar 67 of insulation which bar is also connected with the blade 34. Particular attention is directed to the fact, however, that the blade 34 is always disengaged with its coacting contacts when the blades 65ª and 66 are engaged with their coacting contacts and vice versa, the arrangement being such that it is impossible for all of the blades to simultaneously engage their contacts and to simultaneously close both of the circuits controlled by blades 65ª and 66 and by blade 34.

This is important, since if, for instance, the switch arms 65ᵃ and 66 were closed on the contacts 59ᵃ and 60ᵃ during the supply of service, at which time the switch arm 34 is closed upon the contact 36, any stray currents from the D. C. supply 56ᵃ would result in a false reading of the register A. Suppose, for example, that the negative side of the D. C. supply 56ᵃ were partially or totally grounded. In this case, D. C. current would flow from the positive side of the line 56ᵃ, through the conductor 63ᵃ, the switch arm 66, the conductor 69, the coils 56, the conductor 68, the coil 38, the conductor 37, the switch arm 34, the conductor 31, the generator 28, the conductor 29, and through the ground to the negative side of the D. C. source 56ᵃ. Since the arm 34 is connected to the arms 65ᵃ and 66 by means of the bar 67, there is no danger of both circuits being simultaneously closed and incorrect readings of the register A are thus prevented.

From the contact 61ᵃ, a conductor 68ᵃ is led to the conductor 40 and from the latter, a conductor 68 extends to the coils 56 while a conductor 69 connects said coils 56 to the contact 62ᵃ. Thus it will be seen that portions of the conductor 40 are common to both circuits, enabling simplicity, installation and maintenance to be kept at minimum expense.

It will be clear that with the arms 65ᵃ and 66 closed upon the contacts 57ᵃ and 58ᵃ, the relay 55 will attract the armature 58 as shown in Figures 1 and 3 and hence contacts 62 and 63 will be bridged by the switch arm 61. If it is desired to bridge the contacts 64 and 65, the blades 65ᵃ and 66 of the polarity changing switch are moved into engagement with the contacts 59 and 60 so that polarity will be reversed, and armature 58 will then be attracted to the dotted line position of Figure 3, thus bridging such contacts 64 and 65 by engagement of arm 61 therewith.

When the contacts 62 and 63 are bridged as shown in Figure 1, electric current will flow to the point of service through the meter 10 and through a switch 70 in the conductors 18 and 19 which will be in closed position at this time. A conductor 71 leads from the conductor 18 to a conductor 72 connected to contacts 63 and 65. Other conductors 73 and 74 extend from the contacts 62 and 64 to contacts 75 and 76. A contact 77 is paired with the contact 76 and a conductor 79 leads therefrom and to the conductor 19 and includes a winding 80 of a solenoid 81 of a relay 82, while a contact 83, paired with contact 75, has a conductor 84 leading therefrom to conductor 79 and including a winding 85 of a solenoid 86 of the relay 82. A bridge piece 87 is engaged with contacts 76 and 77.

The relay 82 is detailed in Figures 3 and 4 from which it will be noticed that the solenoids 81 and 86 are mounted on a base 88 and have a bracket 89 disposed between them. A T-shaped rocker 90 is pivoted as at 91 to bracket 89 and at its ends as at 92—92, is pivotally connected to slidable armatures 93 and 94, respectively associated with the windings 80 and 85. An arm or lever 95 is pivoted as at 96 to the bracket 89 and carries the previously mentioned bridge piece 87 which is insulated therefrom. A pin and slot connection 96ᵃ is provided between the rocker 90 and the arm 95.

Since in the relation shown the coil 85 is energized, switch 70 is maintained closed. This switch consists of unitarily movable blades 97 pivoted in place at 98 and coacting with contacts 99. A link 100 is pivoted to but insulated from the blades 97 and the arm 95.

Should it be desired to cut off or stop the supply of electric current to the point of service, the switch arms 65ᵃ and 66 are reversed from the position shown in Figure 9 so as to shift the bridge piece 61 to engage the contacts 64ᵃ and 65ᵃ, the electric current following the path heretofore specifically traced. Thus, the current from the source of supply to the conductors 18 and 19 will be shunted through the coil 80 and will attract the plunger 93 so that the rocker 90 and arm 95 will shift the bridge piece 87 into engagement with contacts 75 and 83. The arm 95 thus pulls link 100 and accordingly the switch blades 97 to open position thus breaking the supply or feed circuit. The connection 96ᵃ permits lost motion of the rocker 90 so that it may gain momentum before engaging the arm 95 to move it, thus rendering operation of the switch certain. Obviously to restore the parts to operating relation from the central station, the switch blades 65ᵃ and 66 are restored to engagement with the contacts 57 and 58, resulting in restoring bridge piece 61 into engagement with contacts 62 and 63, in the manner previously set forth, and of restoring the switch 70 to its closed position as also previously set forth.

As heretofore mentioned, the principles of the invention may be used in connection with the supply of gas, water or the like and in various relations other than that specifically described, and as one illustration, reference is made to Figure 2 where a valve 105 to control water, gas or the like is operated by a link 106, like that at 100 and associated with an arm 107 like that at 95. An arm 108 turns the plug of said valve to on and off positions and is pivoted at 109 to said link 106.

Various changes may be resorted to provided they fall within the spirit and scope of the invention.

I claim as my invention:

1. A public service system comprising a central station and a subscriber's station located at a location remote from the central station; a service meter at the subscriber's station; a second meter at said central station; a metering circuit between and connecting said service meter and said second meter whereby the second meter is operable in response to operation of said service meter; control means at said subscriber's station for controlling the supply of service; electrically actuated means at said subscriber's station connected to said control means for operating the latter to "on" and "off" positions; a polarity changing switch at said central station for controlling operation of said electrically actuated means; means forming a service control circuit between said switch and said electrically actuated means; a second switch connected in said metering circuit for opening and closing the latter; and a connection between said second switch and said polarity changing switch whereby said polarity changing switch can be closed only when said second switch is open.

2. The combination set forth in claim 1 wherein the service control circuit and the metering circuit include a conductor in common to each circuit.

3. The combination set forth in claim 1 wherein one side of the metering circuit comprises a metallic conductor and the other side the ground and in which said metallic conductor forms a part of said service control circuit.

4. A public service system comprising a central station and a subscriber's station located at a location remote from the central station; a service meter at the subscriber's station; a second meter at said central station; a metering circuit between and connecting said service meter and said second meter whereby the second meter is operable in response to operation of said service meter; control means at said subscriber's station for controlling the supply of service; electrically actuated means at said subscriber's station connected to said control means for operating the latter to "on" and "off" positions; a switch at said central station for controlling operation of said electrically actuated means; and means forming a service control circuit between said switch and said electrically actuated means; wherein said service control circuit comprises two wires extending from said central station to said subscriber's station; and wherein said metering circuit on one side comprises one of the wires of said service control circuit and on the other side the ground.

FRANCIS L. O'BRYAN.